United States Patent [19]
King

[11] Patent Number: 5,973,902
[45] Date of Patent: Oct. 26, 1999

[54] MODIFIED SURGE PROTECTOR

[76] Inventor: Kenneth A. King, 3399 Clair Cir., Marietta, Ga. 30066

[21] Appl. No.: 09/133,452

[22] Filed: Aug. 13, 1998

[51] Int. Cl.[6] ....................................................... H02H 3/22
[52] U.S. Cl. ............................ 361/111; 361/118; 340/662
[58] Field of Search ..................................... 361/111, 117, 361/119, 71, 75, 118; 340/635, 662; 307/46, 48, 66

[56] References Cited

U.S. PATENT DOCUMENTS

| | | | |
|---|---|---|---|
| 3,124,738 | 3/1964 | Smith et al. | 321/14 |
| 3,246,296 | 4/1966 | Heizer et al. | 340/14 |
| 4,794,485 | 12/1988 | Bennett | 361/127 |
| 4,947,281 | 8/1990 | Boteler | 361/56 |
| 5,097,379 | 3/1992 | Walton et al. | 361/92 |
| 5,153,806 | 10/1992 | Corey | 361/56 |
| 5,731,942 | 3/1998 | Raviele | 361/75 |

*Primary Examiner*—Michael Sherry

[57] ABSTRACT

A modified surge protector is provided including a housing having a pair of male contacts for being inserted into a power receptacle to receive power therefrom. Associated therewith is a pair of female contacts for releasably receiving a plug of an appliance to supply power thereto. Also included is a power switch connected between the male contacts and the female contacts for allowing the flow of power therebetween only during the receipt of an activation signal. A power variation sensor is connected to the male contacts for detecting a variation in power received therefrom. A delay is included for generating a delay of a predetermined amount of time, wherein the activation signal ceases during the delay of the predetermined amount of time.

8 Claims, 2 Drawing Sheets

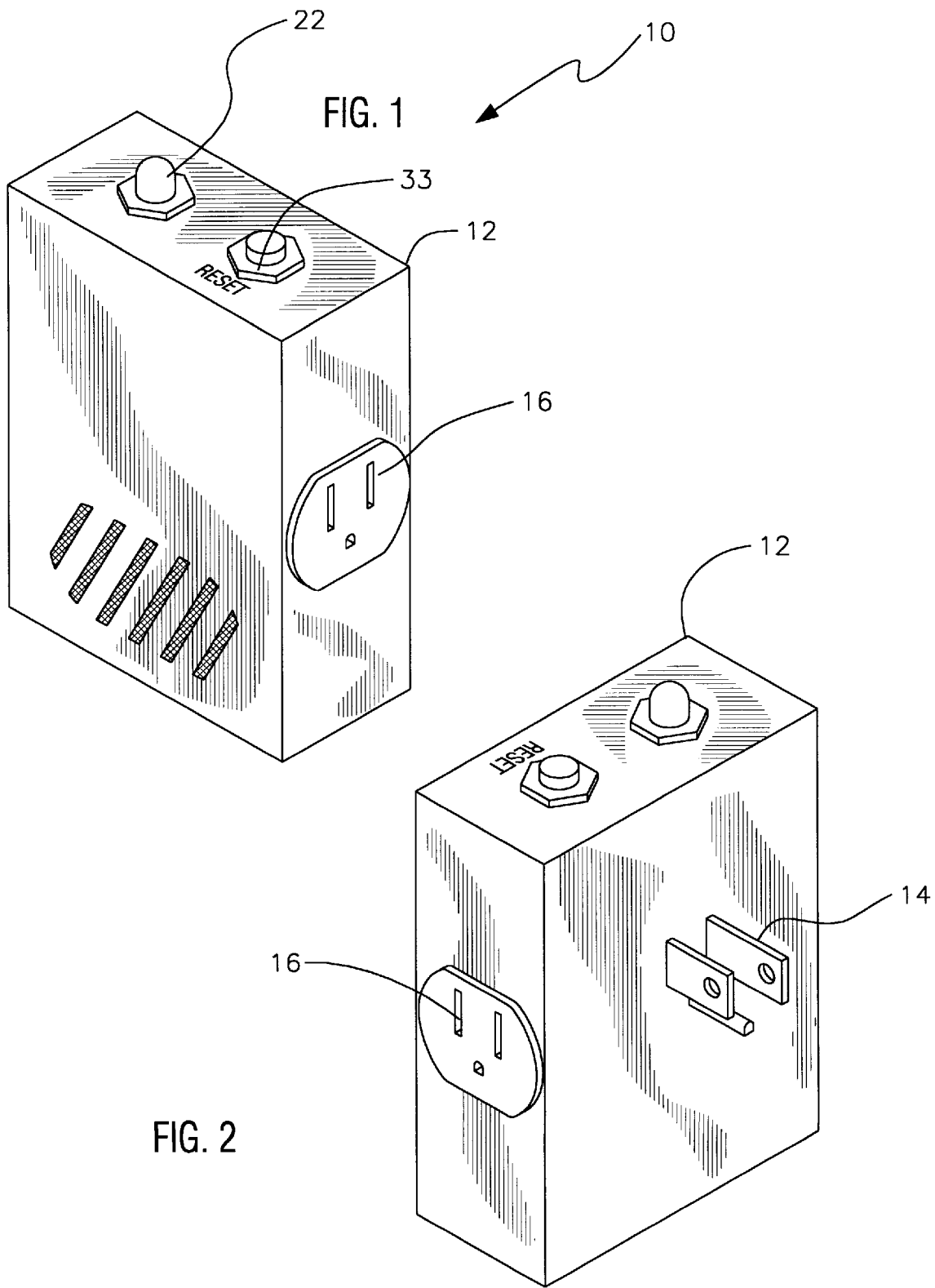

MODIFIED SURGE PROTECTOR

BACKGROUND OF THE INVENTION

1. Field of the Invention

The present invention relates to surge protectors and more particularly pertains to a new modified surge protector for providing a resetable surge protector with an automatic delayed reset upon the loss of power from an associated power receptacle.

2. Description of the Prior Art

The use of surge protectors is known in the prior art. More specifically, surge protectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art surge protectors and the like include U.S. Pat. No. 5,153,806; U.S. Pat. No. 4,794,485; U.S. Pat. No. 4,947,281; U.S. Pat. No. 3,124,738; U.S. Pat. Des. No. 325,370; and U.S. Pat. No. 3,246,296 which are each incorporated herein by reference.

In these respects, the modified surge protector according to the present invention substantially departs from the conventional concepts and designs of the prior art, and in so doing provides an apparatus primarily developed for the purpose of providing a resetable surge protector with an automatic delayed reset upon the loss of power from an associated receptacle.

SUMMARY OF THE INVENTION

In view of the foregoing disadvantages inherent in the known types of surge protectors now present in the prior art, the present invention provides a new modified surge protector construction wherein the same can be utilized for providing a resetable surge protector with an automatic delayed reset upon the loss of power from an associated receptacle.

The general purpose of the present invention, which will be described subsequently in greater detail, is to provide a new modified surge protector apparatus and method which has many of the advantages of the surge protectors mentioned heretofore and many novel features that result in a new modified surge protector which is not anticipated, rendered obvious, suggested, or even implied by any of the prior art surge protectors, either alone or in any combination thereof.

To attain this, the present invention generally comprises a housing with a rectangular configuration. The housing is equipped with a front face, a rear face and a peripheral side wall formed therebetween. The side wall is defined by a top face, a bottom face and a pair of side faces formed therebetween. As shown in FIG. 2, the housing has a pair of male contacts mounted on a central extent of the rear face thereof for being inserted into a power receptacle to receive power therefrom. Associated therewith is a pair of female contacts formed in one of the side faces of the housing. The female contacts are adapted for releasably receiving a plug of a refrigerator to supply power thereto. Connected between the male contacts and the female contacts is a power switch for allowing the flow of power therebetween only during the receipt of an activation signal. A battery is provided for powering purposes, as shown in FIG. 3. For recharging the battery during the receipt of power from the male contacts, a battery charger is connected between the male contacts and the battery. Next provided is a light mounted on the top face of the housing. The light is connected to the male contacts for illuminating during the receipt of power for indicating the same. Also included is an alarm unit for generating an audible sound upon the actuation thereof. FIG. 3 depicts a power variation sensor connected to the male contacts for detecting a loss of power received therefrom. Connected to the power variation sensor is a delay for creating a delay of a predetermined amount of time upon the detection of the loss of power by the power variation sensor. During the delay, the transmission of the activation signal ceases and the alarm unit is activated. Finally, a relay is connected between the male contacts, power switch and alarm unit. In operation, the relay serves to actuate the alarm unit and cease the transmission of the activation signal upon the detection of a surge of power greater than a predetermined amount. The relay continues to actuate the alarm unit and cease the transmission of the activation signal until the depression of a reset button.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new modified surge protector apparatus and method which has many of the advantages of the surge protectors mentioned heretofore and many novel features that result in a new modified surge protector which is not anticipated, rendered obvious, suggested, or even implied by any of the prior art surge protectors, either alone or in any combination thereof.

It is another object of the present invention to provide a new modified surge protector which may be easily and efficiently manufactured and marketed.

It is a further object of the present invention to provide a new modified surge protector which is of a durable and reliable construction.

An even further object of the present invention is to provide a new modified surge protector which is susceptible of a low cost of manufacture with regard to both materials and labor, and which accordingly is then susceptible of low prices of sale to the consuming public, thereby making such modified surge protector economically available to the buying public.

Still yet another object of the present invention is to provide a new modified surge protector which provides in the apparatuses and methods of the prior art some of the advantages thereof, while simultaneously overcoming some of the disadvantages normally associated therewith.

Still another object of the present invention is to provide a new modified surge protector for providing a resetable surge protector with an automatic delayed reset upon the loss of power from an associated receptacle.

Even still another object of the present invention is to provide a new modified surge protector that includes a housing having a pair of male contacts for being inserted into a power receptacle to receive power therefrom. Associated therewith is a pair of female contacts for releasably receiving a plug of an appliance to supply power thereto. Also included is a power switch connected between the male contacts and the female contacts for allowing the flow of power therebetween only during the receipt of an activation signal. A power variation sensor is connected to the male contacts for detecting a variation in power received therefrom. A delay is included for generating a delay of a predetermined amount of time, wherein the activation signal ceases during the delay of the predetermined amount of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front perspective view of a new modified surge protector according to the present invention.

FIG. 2 is a rear perspective view of the present invention.

DESCRIPTION OF THE PREFERRED EMBODIMENT

Figure 3:
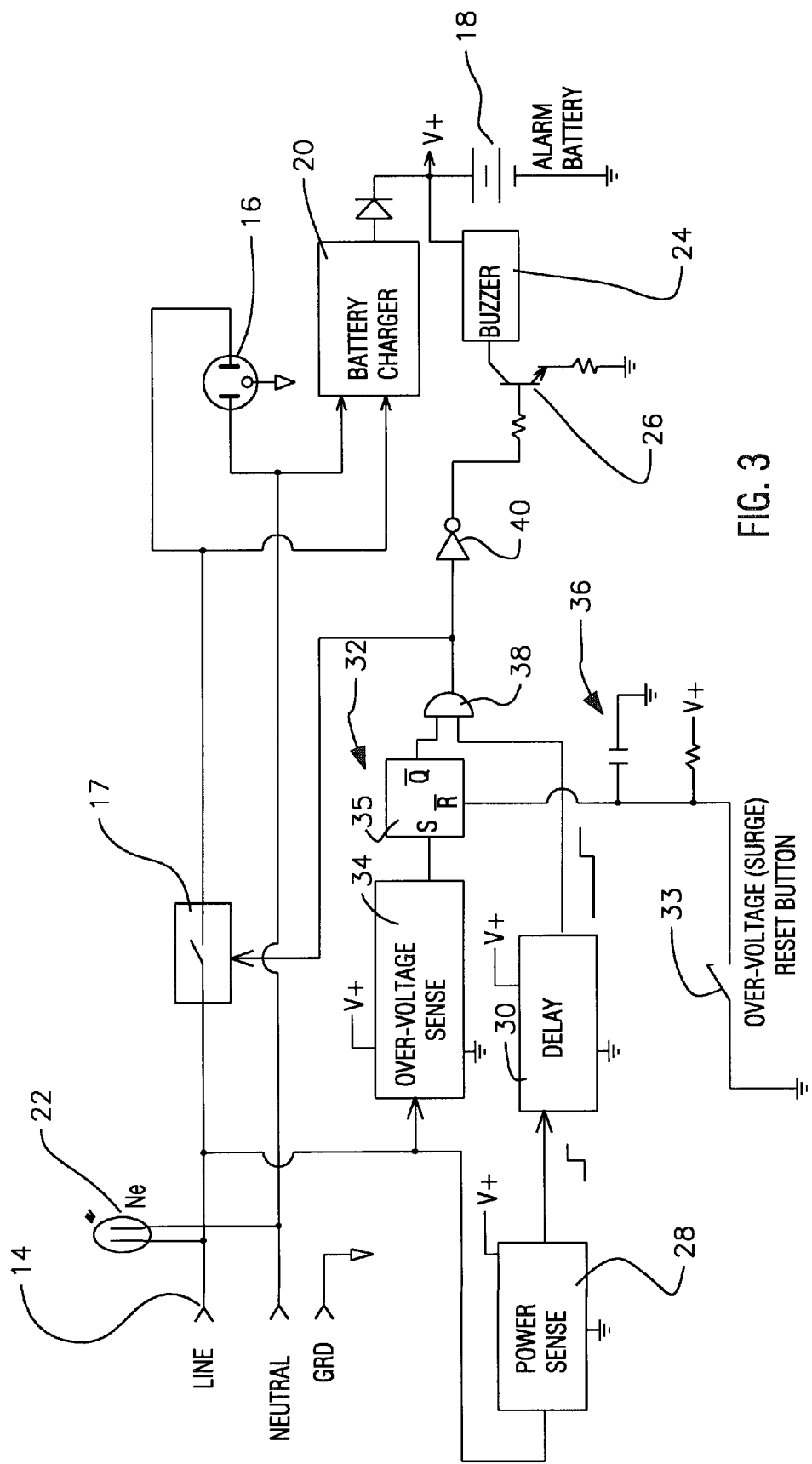
FIG. 3 is a schematic diagram of the present invention.

With reference now to the drawings, and in particular to FIGS. 1 through 3 thereof, a new modified surge protector embodying the principles and concepts of the present invention and generally designated by the reference numeral 10 will be described.

The present invention, designated as numeral 10, includes a housing 12 with a rectangular configuration. The housing is equipped with a front face, a rear face and a peripheral side wall formed therebetween. The side wall is defined by a top face, a bottom face and a pair of side faces formed therebetween. As shown in FIG. 2, the housing has a pair of male contacts 14 mounted on a central extent of the rear face thereof for being inserted into a power receptacle to receive power therefrom. Associated therewith is a pair of female contacts 16 formed in one of the side faces of the housing. The female contacts are adapted for releasably receiving a plug of a refrigerator or other appliance to supply power thereto.

Connected between the male contacts and the female contacts is a voltage controlled power switch 17 for allowing the flow of power between the contacts only during the receipt of an activation signal. A rechargeable battery 18 is provided for powering purposes, as shown in FIG. 3. For recharging the battery during the receipt of power from the male contacts, a battery charger 20 is connected between the male contacts and the battery. A diode is preferably connected between the battery and battery charger for the purpose of directing current in the proper direction.

Next provided is a neon light 22 mounted on the top face of the housing. The light is connected to the male contacts for illuminating during the receipt of power for indicating the same. Also included is an alarm unit 24 for generating an audible sound upon the actuation thereof. The alarm unit preferably has an associated speaker mounted on the front face of the housing. The alarm unit is preferably driven by a transistor 26.

FIG. 3 depicts a power variation sensor 28 connected to the male contacts for detecting a loss of or dip in power received therefrom. As an option, the power variation sensor may also be triggered upon a surge in power. Any type of comparator mechanism or the like may be used to accomplish this task. Connected to the power variation sensor is a delay 30 for creating a delay of a predetermined amount of time of about 15 sec or more upon the detection of a variation in power by the power variation sensor. During the delay, the transmission of the activation signal ceases, thereby precluding power from being supplied to the female contacts. Also during the delay, the alarm unit is activated.

Finally, a relay 32 is connected between the male contacts, power switch and alarm unit. In operation, the relay serves to actuate the alarm unit and cease the transmission of the activation signal upon the detection of a surge of power greater than a predetermined amount. The relay continues to actuate the alarm unit and cease the transmission of the activation signal until the depression of a reset button 33. To accomplish its task, the relay may take the form of an over-voltage sensor 34 and a SR flip flop 35. As shown in FIG. 3, an RC network 36 is connected between the reset button and the SR flip flop for affording a pulse when the button is depressed. As an option, the reset button may be connected directly between the power source and the SR flip flop.

It should be noted that the delay and relay work together such that the activation signal is not transmitted unless both the delay and relay permit such transmission. This may be accomplished by attaching inputs of the delay 30 and gate 38 to the SR flip flop and the delay. By this structure, the activation signal is passed only if present at both inputs. To afford proper operation of the alarm unit, an inverter 40 may be mounted between an output of the delay and gate and the transistor which drives the alarm unit.

The present invention thus affords a device that works as a resetable breaker that requires the depression of a reset button before allowing power to be supplied to an appliance after a surge in power is detected. The present invention further serves to afford an automatic delay prior to allowing power to be supplied to the appliance after a loss in power.

This delay is critical for permitting an appliance to settle prior to restarting.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modified surge protector for a refrigerator comprising, in combination:

a housing with a rectangular configuration with a front face, a rear face for placing adjacent to an electrical wall outlet in a wall surface, the housing having a peripheral side wall formed between the front and rear faces and comprising a top face, a bottom face and a pair of side faces formed therebetween, the housing having a pair of male contacts mounted on a central extent of the rear face thereof for being inserted into a electrical wall outlet to receive power therefrom and a pair of female contacts for releasably receiving a plug of a refrigerator to supply power thereto;

a power switch connected between the male contacts and the female contacts for allowing the flow of power therebetween only during the receipt of an activation signal;

a rechargeable battery for powering purposes;

a battery charger connected between the male contacts and the battery for recharging the battery during the receipt of power from the male contacts;

a light mounted on the top face of the housing and being connected to the male contacts for illuminating during the receipt of power for indicating the receipt of power by the male contacts;

an alarm unit for generating an audible sound upon the actuation of the alarm unit;

a power variation sensor connected to the male contacts for detecting a loss of power received by the male contacts;

a delay mechanism connected to the power variation sensor for creating a delay of a predetermined amount of time upon the detection of the loss of power by the power variation sensor, the delay mechanism being adapted such that during the predetermined time delay the transmission of the activation signal ceases and the alarm unit is actuated to produce an audible alarm; and a relay connected between the male contacts, the power switch and the alarm unit, the relay being adapted to actuate the alarm unit and cease the transmission of the activation signal upon the detection of a surge of power greater than a predetermined amount, wherein the relay continues to actuate the alarm unit and cease the transmission of the activation signal until the depression of a reset button, wherein depression of the reset button does not cause restoration of power to the pair of female contacts prior to the passage of the predetermined time delay to permit a refrigerator connected thereto to settle prior to restarting the refrigerator by resuming the supply of power to the refrigerator.

2. A modified surge protector as set forth in claim 1 additionally comprising a diode connected between the battery and the battery charger for directing current therebetween.

3. A modified surge protector as set forth in claim 1 wherein the alarm unit includes a speaker mounted on the front face of the housing for facilitating projection of the sound of the speaker outward from the housing.

4. A modified surge protector as set forth in claim 1 wherein the power variation sensor is adapted to be triggered by a surge in the voltage level of the power received by the male contacts for protecting a connected refrigerator from a voltage spike.

5. A modified surge protector as set forth in claim 1, wherein the pair of female contacts are formed in one of the side faces of the housing such that an electrical plug engaging the female contacts extends substantially parallel to a wall surface when the pair of male contacts are inserted in a wall electrical outlet to minimize the protrusion of the electrical plug behind a refrigerator.

6. A modified surge protector as set forth in claim 1, additionally comprising a diode connected between the battery and the battery charger for directing current between the battery and battery charger.

7. A modified surge protector as set forth in claim 1, wherein the predetermined time delay is about 15 seconds or more for permitting a refrigerator connected to the female contacts to settle prior to restarting of the refrigerator.

8. A modified surge protector as set forth in claim 1, wherein the relay comprises an over-voltage sensor and a SR flip flop, wherein an RC network is connected between the reset button and the SR flip flop for producing a pulse when the button is depressed.

* * * * *